United States Patent Office 3,064,103
Patented Nov. 13, 1962

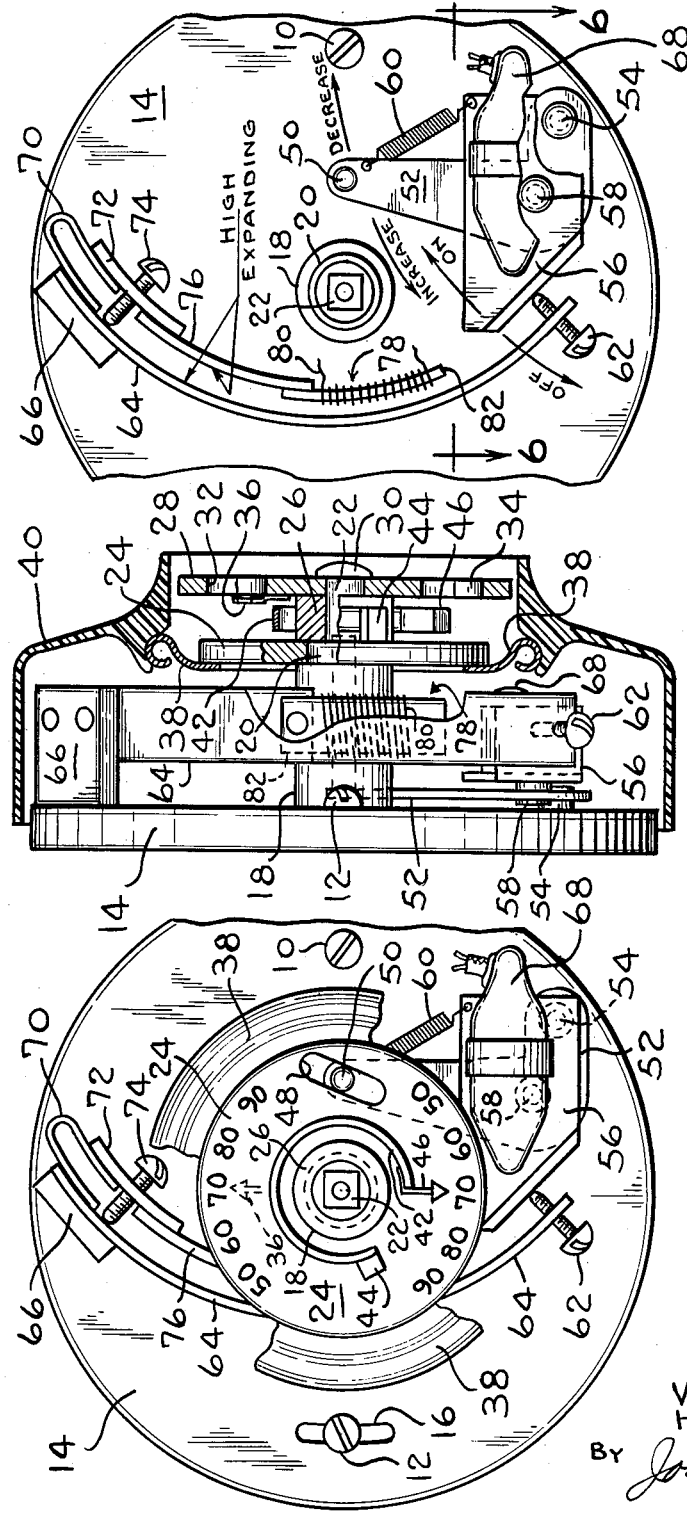

3,064,103
VARIABLE THERMOSTAT ANTICIPATOR
William A. Biermann, Brookfield, and Harry E. Rowland, Wauwatosa, Wis., assignors to Controls Company of America, Milwaukee, Wis., a corporation of Delaware
Filed May 22, 1958, Ser. No. 737,082
3 Claims. (Cl. 200—122)

This invention relates to room thermostats of the heat anticipator type.

In anticipated room thermostats a small heater (anticipator) is mounted adjacent the sensing bimetal and is energized when the sensing bimetal actuates the switch mechanism to place the heating system in operation. As is well known, the heat of the anticipator is felt by the sensor bimetal and causes the sensor bimetal to shut down the heat system prior to the room temperature actually attaining the desired temperature. Since all heat systems have a certain amount of carry-over heat, which is pumped into the heated space after the system shuts down, the anticipator anticipates the arrival of this added heat and prevents the room temperature from going above the desired temperature. Under the normal operating conditions this type of heat anticipation is quite satisfactory. A problem arises, however, in very cold weather when the heating load is greater than normal. Under these circumstances the thermostat "calls for heat" for such a great percentage of the time that the influence of the anticipator becomes out of proportion to the actual heating conditions. When this occurs, the anticipator gives off so much heat as to cause the room temperature maintained by the thermostat to drift downward from the desired temperature. The only manner in which the usual anticipated thermostat can be made to maintain the desired room temperature is to set the thermostat above the desired temperature.

Most anticipated room thermostats have some means of adjusting the position of the anticipator with respect to the sensor bimetal. This, however, is an internal adjustment and one which should only be undertaken by a person who understands the thermostat quite well and, therefore, is not one which can be accomplished by the home owner with changes in outdoor temperature.

The principal object of this invention is to provide an anticipated room thermostat in which the degree of anticipation is automatically varied as the heating load varies. In carrying out this invention I utilize the duration and frequency of the "on" cycle of the thermostat as a measure of the heating load. I mount the anticipator on a bimetal which is slightly affected by the heat of the anticipator so that if the thermostat is "on" for an appreciable period of time the heat of the anticipator affects the anticipator mounting bimetal to move the anticipator away from the sensor bimetal and decrease the influence of the anticipator on the sensor bimetal. This arrangement will not only prevent the downward drift mentioned above, but will also improve the thermostat characteristics on picking up the load in the morning after a night shutdown. Under such circumstances the usual anticipator continuously tells the room thermostat that the conditions are satisfied even though the room temperature still is well below the desired temperature. With the present arrangement, the heating system will remain on for longer periods and achieve a faster pickup in the morning.

In the drawings I have shown my invention applied to a room thermostat having a round configuration which enjoys current popularity. The round thermostats currently available are somewhat difficult to install and calibrate and about the only practical method involves the expenditure of considerable time since a trial setting must be made and then the thermostat left alone for a considerable period of time to stabilize all the temperatures whereupon the thermostat can then be inspected to see if the maintained and set temperatures are in agreement. If not, the mounting is adjusted and re-checked.

Another object of the present invention is to greatly simplify the installation of round type thermostats.

In order to facilitate the installation of the present thermostat, I have provided the thermostat with a mercury switch which also acts as a level and in order to properly mount the thermostat in proper calibration it is necessary only to adjust the rotary position of the thermostat until the mercury in the mercury switch indicates a level condition. Of course, during this operation it is desirable to wear gloves or the like to cut down the heat affect of the hands of the installer.

Other objects and advantages will be pointed out in, or be apparent from, the specification and claims, as will obvious modifications of the single embodiment shown in the drawings, in which:

FIGURE 1 is a front elevation of the present thermostat;

FIGURE 2 is a side elevation of the present thermostat;

FIGURE 3 is an enlarged front elevation of the present thermostat with the cover removed;

FIGURE 4 is a vertical section through the present thermostat with the cover in place;

FIGURE 5 is a fragmentary front elevation with some of the parts removed to expose other parts; and FIGURE 6 is a section taken as indicated by line 6—6 on FIGURE 5.

Referring to the drawings in detail, the thermostat is adapted to be secured to a wall by means of screws 10, 12 passing through the mounting plate 14 into the wall. It will be noted that screw 12 passes through a slot 16 in the mounting plate which permits adjustment of the mounting plate about screw 10 for leveling purposes as will appear hereinafter. Projecting forwardly from the base plate 14 is a central mounting pin or shaft 18 which has a reduced diameter portion 20 and a square shafted portion 22 at the outer end. A rotatable dial plate 24 is mounted on the round portion 20 while a fixed spacer 26 and a fixed circular face plate 28 are fixed on the squared end 22 of shaft 18. The dial plate 24, spacer 26 and face plate 28 are retained on shaft 18 by means of the headed pin 30 pressed into the central aperture of the squared end 22 of the shaft. It will be noted that the face plate is provided with upper and lower apertures 32, 34 through which the indicia on the front of dial plate 24 may be observed. It will also be noted that an indicator pointer 36 is fixed to the rear of the face plate so as to be observed when looking through the upper aperture 32 to observe the indicia on the top portion of dial plate 24. This pointer indicates, in cooperation with the top indicia on the dial plate, the room temperature setting.

As mentioned above, the dial plate 24 is rotatable on shaft 18. Mounted on the rear of the dial plate is a spring type mounting ring 38 onto which the case 40 is pressed as best seen in FIGURE 4. Thus, the case 40 is connected to the dial plate 24 and, hence, it is rotatable to rotate the dial plate 24 on shaft 18. A room temperature sensing bimetal 42 is fixed on the face of dial plate 24 by bracket 44 and wraps around the spacer 26 with pointer 46 on its free end to cooperate with the indicia on the lower portion of plate 24 to indicate ambient temperature. Since the bimetal is mounted on the plate 24, rotation of the plate 24 merely changes the range of figures observable through the aperture 34 in the lower portion of the fixed face plate 28. The dial plate 24 is provided with a slot 48 into which pin 50 projects. Due to the angular disposition of the slot 48, rotation of dial plate 24 will effect movement of pin 50 for the purpose of changing the thermostat setting.

Pin 50 is carried on the upper end of crank 52 pivoted on pin 54. Crank 52 also carries the mercury switch bracket 56 on pin 58 about which the bracket may rotate. A tensioned spring 60 connected between bracket 56 and crank 52 biases the bracket flange to bear against the end of screw 62 in the free end of the sensor bimetal 64 fixed to the mounting plate at bracket 66. When the casing 40 is rotated (as viewed from the front) in a counter-clockwise direction, the pin 50 and slot 48 move the crank 52 counter-clockwise about its pivot as indicated by the arrow in FIGURE 5. This lowers the switch bracket pivot 58 and causes the bracket to pivot about the end of screw 62 so as to tip the mercury switch 68 clockwise about pivot 58 and close the contacts in the switch. This, of course, would close the circuit to start the furnace. It will also be appreciated that by rotating the casing in a counter-clockwise direction, higher numbers would be moved under pointer 36 (which is fixed).

As mentioned above, bimetal 64 is mounted on bracket 66. Also secured to bracket 66 is a spring mount 70 to which plate 72 is connected. Plate 72 has an adjusting screw 74 which bears against bimetal 64 to thereby vary the spacing between plate 72 and the bimetal and, as will appear hereinafter, vary the initial adjustment of the anticipator. Plate 72 carries the adjusting bimetal 76 which, in turn, carries the anticipator 78 which comprises a resistance wire 80 wound on a suitable insulating board 82. It will be appreciated, therefore, that adjusting screw 74 varies the spacing between the anticipator 78 and bimetal 64 and, hence, varies the influence of the anticipator on the bimetal.

The high expanding sides of sensor bimetal 64 and adjusting bimetal 76 face each other as indicated on FIGURE 5. Thus, increasing heat will cause the lower end of bimetal 64 to swing in a counter-clockwise direction while increasing heat causes the anticipator to move in a generally clockwise path. This, of course, means that the anticipator moves away from the sensor bimetal 64 as the temperature of the adjusting bimetal 76 rises. The characteristics of the sensor bimetal are such that in normal load conditions, the amount of heat given off by the anticipator 78 has a virtually negligible affect whereas long sustained "on" cycles will cause the anticipator to give off sufficient heat to gradually heat the adjusting bimetal 76 by conduction and convection and move the anticipator 78 away from the operator bimetal and, hence, reduce the influence of the anticipator and prevent the downward drifting of the maintained temperature or, as mentioned above, to facilitate the morning pickup. The construction provided gives both the initial anticipator adjustment as determined by screw 74 and the automatic anticipator adjustment as obtained by reason of the anticipator being mounted on bimetal 76. When installing the thermostat it is only necessary to set the thermostat to correspond with the ambient reading, level the thermostat by means of the mercury in the mercury switch, and then tighten screw 12 to fix the thermostat in place. This having been done, the thermostat is automatically in calibration. It is, of course, desirable to eliminate, as much as possible, the effect of heat transfer from the hands and to this end it might be advisable to wear gloves which would preferably be put on immediately before making the final calibration mounting. This installation procedure is far simpler and more rapid that that for any comparable thermostats.

It will be appreciated the arrangement of either or both sets of indicia may be reversed to suit preferences of actuation or reading. This can be done by changing the slot arrangement or the bimetal characteristics (i.e. placing the high expanding side on opposite sides). These features are mere design choice.

Although but one embodiment of the present invention has been illustrated and described, it will be apparent to those skilled in the art that various changes and modifications may be made therein without departing from the spirit of the invention or from the scope of the appended claims.

We claim:

1. A room thermostat comprising a base plate, a shaft projecting therefrom, a dial plate rotatable thereon and having indicia on its front surface, a face plate fixed on the shaft and apertured to allow observation of the indicia, a bimetal connected to the base, a mercury switch operated by the bimetal, said switch serving as a level in installing the thermostat, the indicia being set to correspond to ambient temperature at which time the mercury switch should be level, and means responsive to rotation of the dial plate for adjusting the switch relative to the bimetal.

2. A room thermostat comprising a base plate, a shaft projecting therefrom, a dial plate rotatable thereon and having indicia on its front surface, an ambient temperature indicating bimetal on the dial plate to cooperate with suitable indicia thereon to indicate room temperature, a face plate fixed on the shaft and apertured to allow observation of the indicia, a fixed pointer on the face plate and indicia on the dial plate cooperating with the pointer to indicate the temperature setting of the thermostat, a case connected to the dial plate for rotating the dial plate on the shaft, a bimetal connected to the base, a switch operated by the bimetal, and switch adjusting means including cam and cam follower means acting between the switch and the dial plate.

3. A thermostat according to claim 1 in which a heat anticipator is mounted adjacent the bimetal, and means for varying the influence of the anticipator in accordance with heat load.

References Cited in the file of this patent

UNITED STATES PATENTS

| | | |
|---|---|---|
| 1,997,559 | Hajek | Apr. 9, 1935 |
| 2,145,722 | Hall | Jan. 31, 1939 |
| 2,225,975 | Bruce | Dec. 24, 1940 |
| 2,343,670 | Holmes | Mar. 7, 1944 |
| 2,371,018 | Ashworth et al. | Mar. 6, 1945 |
| 2,508,350 | Belgeri | May 23, 1950 |
| 2,729,719 | Kronmiller | Jan. 3, 1956 |
| 2,783,332 | Kunzler | Feb. 26, 1957 |
| 2,788,415 | Payne | Apr. 9, 1957 |
| 2,803,722 | Kuhn | Aug. 20, 1957 |
| 2,847,536 | Bishop | Aug. 12, 1958 |
| 2,969,917 | Nason | Jan. 31, 1961 |